Nov. 9, 1965  N. PROCTOR  3,217,114
KEY EJECTOR APPARATUS FOR IGNITION SWITCH
Filed June 8, 1964

INVENTOR.
NAVOR PROCTOR
BY
ATTORNEY

United States Patent Office 3,217,114
Patented Nov. 9, 1965

3,217,114
KEY EJECTOR APPARATUS FOR IGNITION SWITCH
Navor Proctor, Globe, Ariz., assignor to
W. M. Schwarz, Miami, Ariz.
Filed June 8, 1964, Ser. No. 373,466
4 Claims. (Cl. 200—44)

This invention pertains to key ejecting apparatus for an automobile ignition switch.

One of the objects of this invention is to provide a key ejector for an automobile ignition switch which will be foolproof, capable of easy installation, and which conforms to the specifications of the insurance underwriters.

Another object of this invention is to provide a rotatable lock barrel mounted at the instrument panel of a motor vehicle in the conventional manner having at the rear end of the barrel a solenoid with an actuating armature arranged so that when the key is turned to off position the key will be ejected from the lock after a predetermined short interval of time has elapsed.

Further features and advantages of this invention will appear from a detailed description of the drawings in which.

As an example of one embodiment of this invention, there is shown a key ejector apparatus for a motor vehicle having an ignition switch body 10 suitably mounted on the dash 11 of the vehicle. The ignition switch has the usual rotatable tumbler cylinder 12 and ignition key 13 which may be inserted longitudinally into or removed from the tumbler cylinder 12 in the usual manner.

Figure 1:
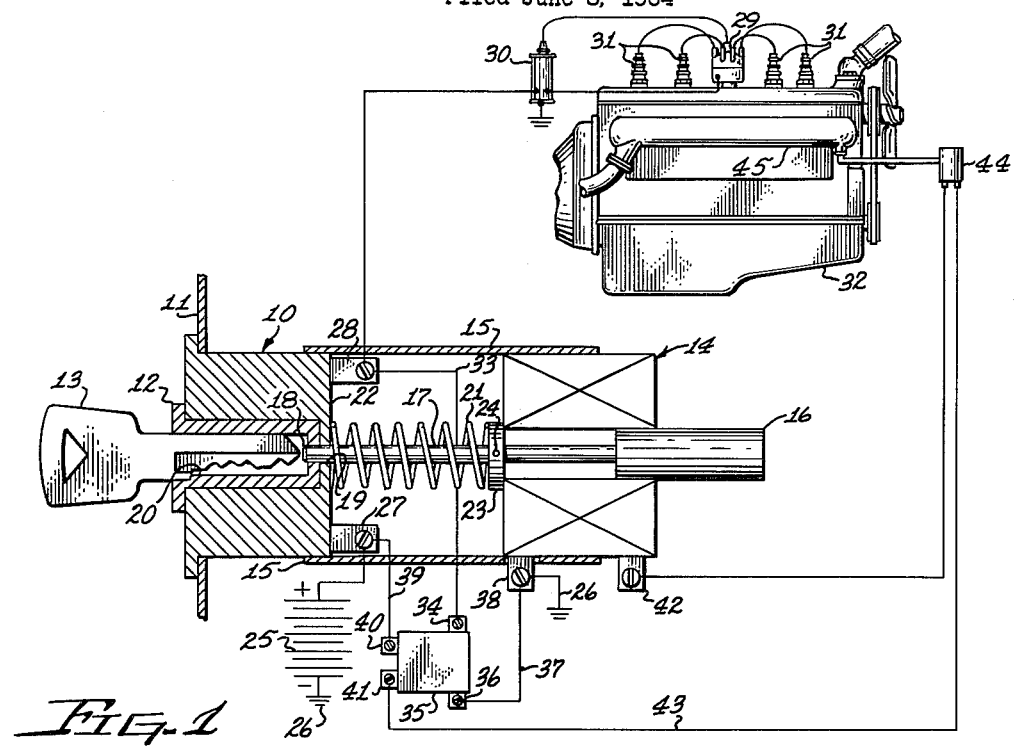
FIG. 1 is a diagram showing the arrangement of the apparatus with engine running and the ignition key in the ignition switch.
Figure 2:
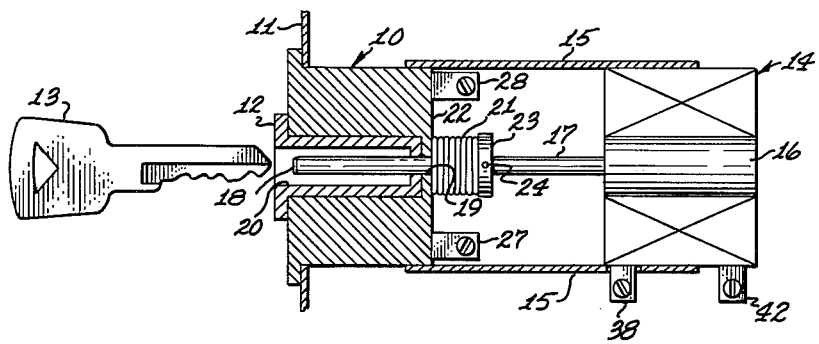
FIG. 2 is a view similar to FIG. 1 showing the parts at the time of key ejection.

An ejector solenoid 14 is suitably attached to the ignition switch 10 as by mounting brackets 15 and has an armature 16 to which is fixed a push rod 17 having its outer end 18 slidingly supported in a suitably bore 19 formed in the rear of the ignition switch 10 so that the outer end 18 of the push rod 17 may move to the left in FIG. 2, through the tumbler cylinder key slot 20 to eject the key. A suitable compression spring 21 confined between the rear face 22 of the ignition switch 10 and a stop collar 23 fixed to the push rod 17 by a suitable pin 24 normally returns the push rod 17 and armature 16 to retracted position shown in FIG. 1

The storage battery 25 of the motor vehicle has one terminal connected to ground at 26 while its other terminal is connected to the hot side terminal 27 of the ignition switch 10. The other deenergizable terminal 28 of the ignition switch is connected in the usual manner to the distributor 29 and the ignition coil 30 for the spark plugs 31 of the internal combustion engine 32 of the motor vehicle.

The deenergizable terminal 28 of the ignition switch 10 is connected through lead 33 to one operating terminal 34 of a delayed action one impulse relay 35 having its other operating terminal 36 connected through a lead 37 to the ground terminal 38 of the solenoid 14. The hot terminal 27 of the ignition switch 10 is connected through lead 39 to one control terminal 40 of the relay 35, while the other contact terminal 41 of the relay 35 is connected to the operating terminal 42 of the solenoid 14 through a lead 43.

When the key 13 is turned to shut off the ignition and is out of the lock, switch terminal 28 is deenergized so that relay 35 is deenergized to disconnect its control terminals 40 and 41 from each other. This deenergizes the solenoid coil 14 allowing the armature 16 and push rod 17 under the influence of the spring 21 to move to retracted position as shown in FIG. 1. A normally open vacuum switch 44 actuated from the intake manifold 45 of the engine 32 is connected in series with the terminal 41 of relay 35 and terminal 42 of solenoid 14 so as to prevent energizing the solenoid 14 when the key 13 is turned to start the engine and while the engine is running.

When the key 13 is turned to shut off position of the engine, the engine stops allowing the vacuum switch to close, connecting solenoid terminal 42 to relay terminal 40. Deenergizing terminals 34 and 36 of the relay causes terminals 40 and 41 thereof to be momentarily connected which momentarily energizes the solenoid 14 to cause its armature to move, to the left in FIG. 2, to eject the key 13 from the lock so that the operator of the vehicle does not inadvertently leave the key in the lock for possible theft of the vehicle. Preferably, the relay is arranged with a delayed action on impulse arrangement so that a period of time elapses from the time its terminals 34 and 36 are energized and the key is actually ejected. Further, after the relay 35 has been energized to connect terminals 40 and 41, it disconnects and maintains disconnected these terminals 40 and 41, ready for the next cycle of operation described.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. An ignition key ejector comprising in combination:
   (A) an ignition switch,
   (B) an ignition key adapted to be inserted into and removed from said switch,
   (C) a solenoid mounted on said switch having,
   (D) an armature including a push rod having its outer end aligned with said ignition switch,
   (E) and a relay means energized when said key is turned to off position of said ignition switch to energize said solenoid to cause said push rod to eject said key from said ignition switch.

2. An ignition switch including in combination:
   (A) an ignition switch body,
   (B) a tumbler cylinder in said body having a key slot,
   (C) a key adapted to be presented in said slot,
   (D) a solenoid mounted on said switch body,
   (E) an armature in said solenoid,
   (F) a push rod fixed to said armature slidable in said key slot,
   (G) and electric control means adapted to energize said solenoid to cause said push rod to eject said key from the tumbler cylinder and switch body when said key is turned to off position.

3. An ignition switch including in combination:
   (A) an ignition switch body,
   (B) a tumbler cylinder in said body having a key slot,
   (C) a key adapted to be presented in said slot,
   (D) a solenoid mounted on said switch body,
   (E) an armature in said solenoid,
   (F) a push rod fixed to said armature slidable in said key slot,
   (G) electric control means adapted to energize said solenoid to cause said push rod to eject said key from the tumbler cylinder and switch body when said key is turned to off position,
   (H) said last mentioned means including a delayed action one impulse relay for ejecting said key after a predetermined interval of time has elapsed since the key was turned to off position of said ignition switch.

4. An ignition switch including in combination:
(A) an ignition switch body,
(B) a tumbler cylinder in said body having a key slot,
(C) a key adapted to be presented in said slot,
(D) a solenoid mounted on said switch body,
(E) an armature in said solenoid,
(F) a push rod fixed to said armature slidable in said key slot,
(G) electric control means adapted to energize said solenoid to cause said push rod to eject said key from the tumbler cylinder and switch body when said key is turned to off position,
(H) said last mentioned means including a delayed action one impulse relay for ejecting said key after a predetermined interval of time has elapsed since the key was turned to off position of said ignition switch,
(I) and means for automatically returning said armature and push rod to retracted position when said solenoid is deenergized.

No references cited.

KATHLEEN H. CLAFFY, *Primary Examiner.*